United States Patent Office 3,322,342
Patented May 30, 1967

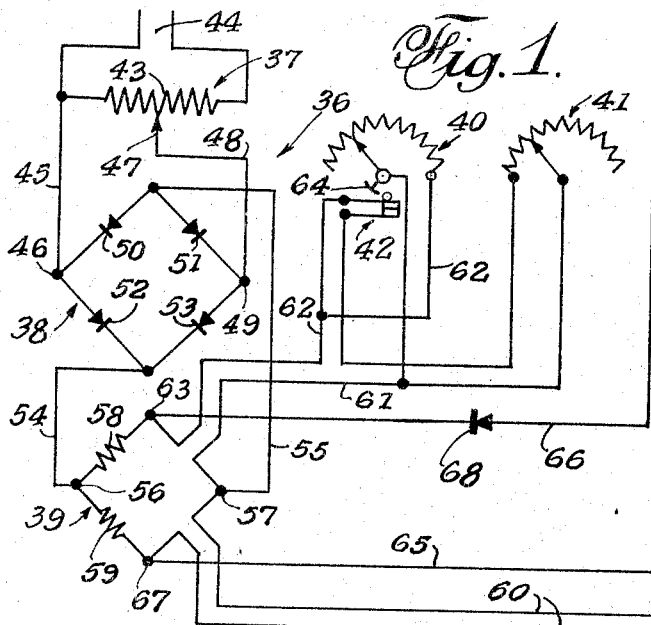
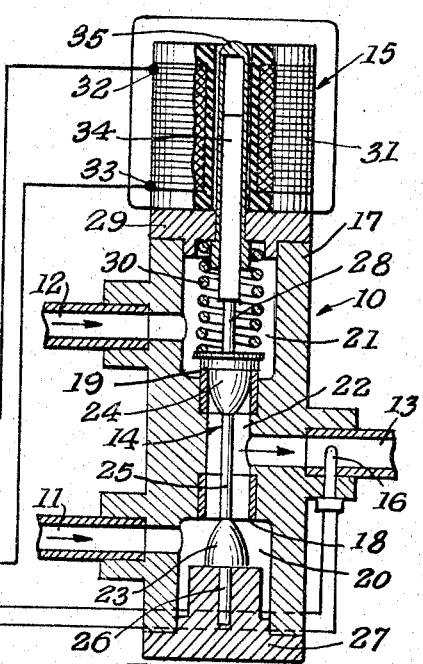
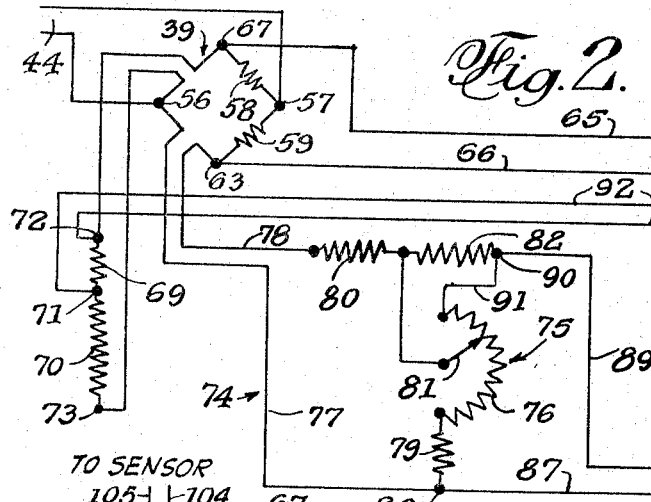
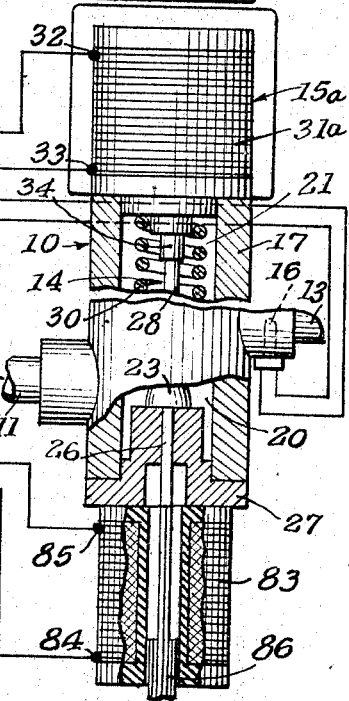
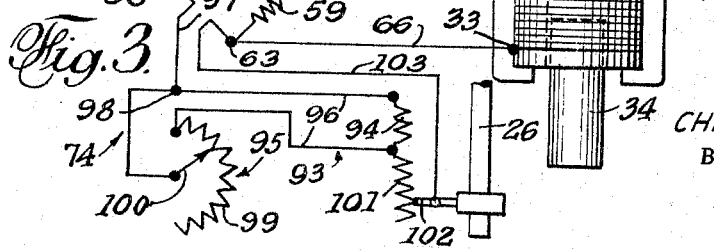
INVENTOR.
CHARLES CLIFFORD VEALE
BY C. G. Stratton
ATTORNEY

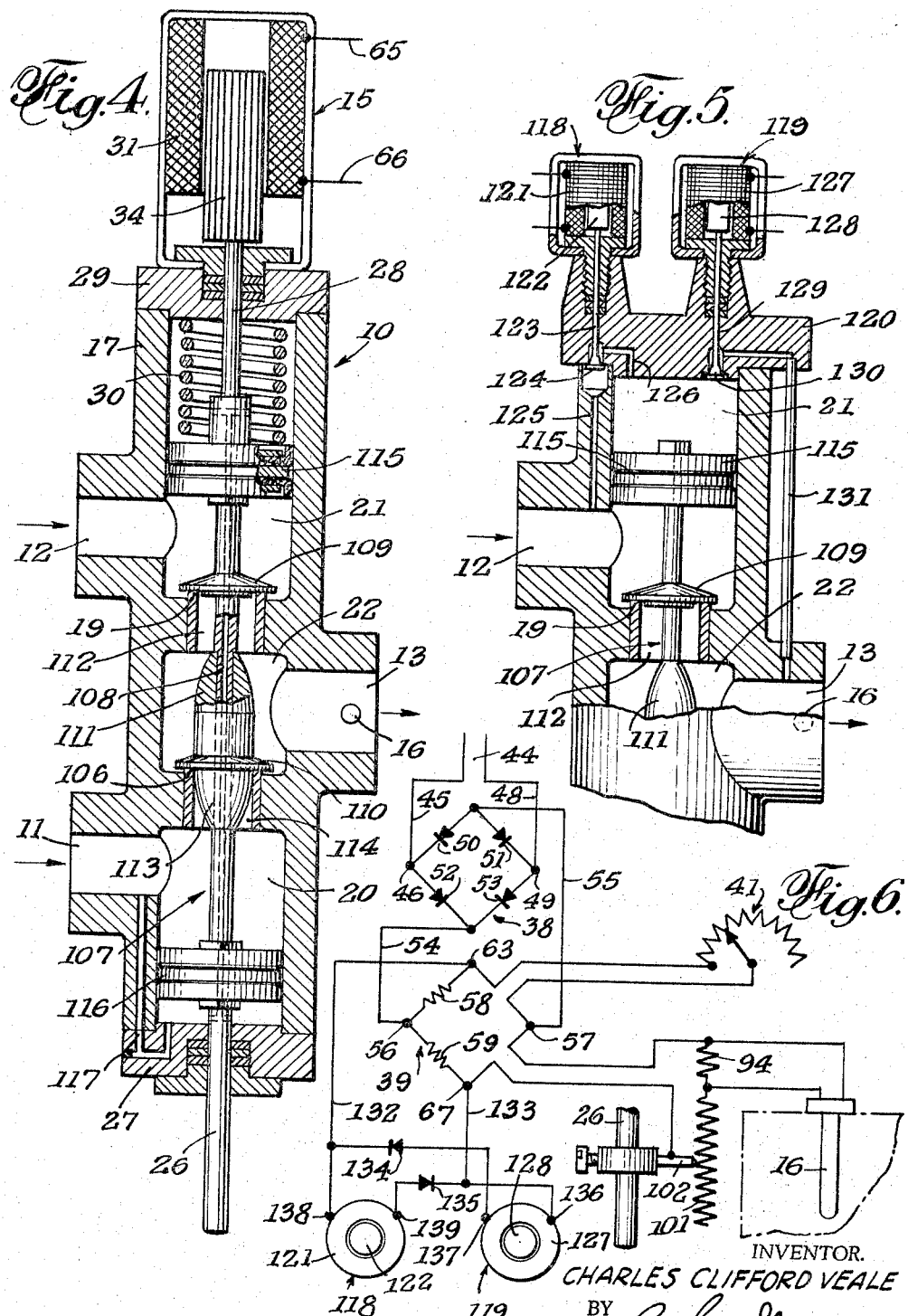

3,322,342
SENSOR-CONTROLLED MEANS FOR REGULATING THE TEMPERATURE OF A FLUID FLOW
Charles Clifford Veale, 950 Canyon View Drive, Laguna Beach, Calif. 92651
Filed Mar. 7, 1966, Ser. No. 541,422
17 Claims. (Cl. 236—12)

This application is a continuation-in-part of my pending application filed July 6, 1964, Ser No. 380,396, titled, "Fluid Temperature Control System," now abandoned.

The present invention relates to fluid-flow rate-modulating means for proportioning a plurality of inlet flows for producing a mixture thereof having a present temperature level.

In systems in which a predetermined temperature level of a discharge or outlet flow of water is desired, two or more inlet flows, each from a source or supply at a different temperature, are proportioned by independent or mixing valves to provide such an outlet flow. Bath shower nozzles and similar hot and cold water mixing means, are examples of such systems, which have the primary fault of being undependable as to the outlet temperature level due to variations, for one reason or another, of the temperature of one or both supply flows. Such lack of dependability is not only inconvenient or annoying to the user, but may cause a sudden rise in temperature at the outlet that may be dangerous to the user.

An object of the present invention is to provide means that controls the flow rates of at least two inlet flows at different temperatures, and proportions said flows to form a discharge or outlet flow at a desired temperature level and under control of a sensor subject to the temperature of the outlet flow, and automatically varies the flow rates of said inlet flows, accordingly.

Another object of the invention is to provide means, as above characterized, that employs electrical means provided with a solenoid-controlled proportioning valve to obtain such flow-rate variation.

A further object of the invention is to provide a control system, as above indicated, that provides for a modulated or interrupted flow of electric current and which controls the flow rate proportioning position of a mixing valve, according to variation in the resistance of the sensor which resistance results from changes in the temperature level at the outlet of said valve.

A still further object of the invention is to provide a system, as above characterized, in which each inlet flow is independently controlled, and simultaneously operable to increase the flow rate of one inlet while proportionally decreasing the flow rate of the other.

A yet further object of the invention is to provide means, in such a mixing valve, to control the operative movement of flow-rate controlling means to obviate position-hunting and sudden changes in the inlet flow to the valve caused by such hunting.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description and which is based on the accompanying drawings. However, said drawings merely show, and the following description merely describes, preferred embodiments of the present invention, which are given by way of illustration or example only.

In the drawings, like reference characters designate similar parts in the several views.

FIG. 1 is a longitudinal sectional view of a flow-rate proportioning valve provided with sensor-controlled fluid-flow rate-modulating means for operating said valve.

FIG. 2 is a similar view of a modification provided with an impedance coil to control balance of the rate-modulating means.

FIG. 3 shows a modification of the control means wherein the impedance coil of FIG. 2 is replaced by a variable resistance control system.

FIG. 4 is a longitudinal sectional view of a modified form of valve provided with hunt-retarding means.

FIG. 5 is a broken longitudinal sectional view of a modified form of valve as in FIG. 4.

FIG. 6 is a diagrammatic view illustrating a control circuit for the valve shown in FIG. 5, it being understood that the part of FIG. 5 that is broken way is illustrated at the lower end of FIG. 4.

The system that is illustrated in FIG. 1 comprises generally, a valve 10 which is provided with two inlets 11 and 12 connected to independent sources of water and at different temperatures, a single outlet 13, and a poppet 14 to proportion the flow from said inlets to said outlet; a D.C. solenoid 15 to control movement of the poppet 14; a sensor or thermistor 16 disposed in the outlet flow; and an electric system responsive to resistance variation of the thermistor to energize the solenoid accordingly, and thereby adjust the position of the poppet to proportion the flow reaching the outlet 13 from the inlets 11 and 12.

The valve 10 comprises a body 17 provided with aligned valve seats 18 and 19. The seat 18 opens on a chamber 20 that connects with the inlet 11, and the seat 19 opens on a chamber 21 that connects with the inlet 12. A chamber 22 extends between the seats 18 and 19 and connects with the outlet 13.

The poppet 14 comprises two contoured or tapered valve elements 23 and 24 that are connected by a stem 25, the former being operatively associated with the valve seat 18 to control flow through said seat according to the degree of intrusion of said element 23 into said seat, the taper of the element decreasing the flow as the intrusion is increased, until with maximum intrusion, the flow through valve seat 18 is closed. The poppet element 24 controls flow through seat 19 in the same way, except that valve seat 19 closes as valve seat 18 opens, and vice versa. An extension stem 26 from the poppet element 23 is guided in a closure cap 27 fitted to one end of the body 17. A second stem 28 extends from the poppet element 24 toward a housing closure cap 29 fitted to the opposite end of the valve body. A coil spring 30 in the chamber 21 between the poppet element 24 and said closure cap 29 biases the poppet 14 in a direction to close the valve seat 19 and open the seat 18.

The solenoid 15 is shown as being mounted on the closure cap 29, the same comprising a coil 31 having lead connections or terminals 32 and 33 for receiving excitation current; an armature, or plunger 34, extending from the extension stem 28, is guided in a dielectric enclosure 35 that extends along the axis of said coil. It will be clear that electrical excitation of said coil will cause the armature 34 to be magnetically drawn into the guide 35 against the bias of the spring 28, to move the poppet 14 in a direction to lessen flow, or close the seat 18 and increase flow or fully open the seat 19.

The thermistor 16 is a commercial device that houses a resistance which decreases as the temperature of the flow through the outlet 13 increases, and increases when said flow cools.

The electrical system designated 36, shown in FIG. 1, comprises, generally, an auto-transformer 37, a full wave rectifier 38 across said auto-transformer, a Wheatstone bridge 39 connected across the rectifier 38 and across the terminals 32 and 33 of the solenoid coil 15, and rheostats 40 and 41, the latter with a cut-out switch 42 controlled by the former, in series with one leg of said bridge, said bridge also being connected in series by another leg to the thermistor 16. It will be clear that the resistance of the rheostats 40 and/or 41, and that of the thermistor, comprise two of the four resistances of the bridge 39.

The auto-transformer 37 comprises a coil 43 that is connected across an A.C. line 44, one terminal of said coil being connected by a line 45 to an input terminal 46 of the rectifier 38. A brush 47 is adjustable along the coil 43 and, by a line 48, connects with an input terminal 49 across the terminal 46. The four legs of the rectifier are provided with rectifiers 50, 51, 52 and 53.

The auto-transformer 37 comprises a voltage divider across the line 44 and is devised to raise or lower the voltage flowing in lines 45 and 48 between zero and maximum. The full wave rectifier 38 converts the A.C. received thereby to direct current which flows in lines 54 and 55 and connects to terminals 56 and 57, respectively of the Wheatstone bridge 39.

Said Wheatstone bridge 39 is provided with fixed resistors 58 and 59 in two of its legs. The resistance of the thermistor 16 is connected by lines 60 to a third leg of said bridge. The rheostats are connected in parallel and constitute adjustable resistances in the fourth leg of the bridge.

The thermistor 16 modifies the resistance in the bridge circuit, as its resistance varies in response to temperature changes in the outlet flow from valve 10, or interrupts current flow in the sensing circuit 60 in relation to the temperature level requirements of the system.

The rheostats or adjustable resistors 40 and 41 comprise remote control means which may be preset at one or more convenient locations to set the temperature level to be maintained in the flow from valve 10 for any particular usage desired. Said variable resistances 40 and 41 are connected by lines 61 and 62 in the bridge leg between terminal 57 and a terminal 63 of the bridge. The resistance 40 is in series with lines 61 and 62 while the resistance 41 has the switch 42 in series in said lines 61 and 62. A cam 64 on the adjuster arm of rheostat 40 has the purpose of disconnecting the rheostat 41 by opening switch contact 42 for reasons of safety when the rheostat 40 is being used for purposes such as baths or showers, to keep all other controls out of the circuit. The bridge is balanced when rheostat 41 is set at maximum resistance, which setting results in lower water temperature. When the rheostat 40 is set at maximum resistance, at which time switch 42 is closed, the rheostat 41 can be set to take over control of the system by shorting out resistance 40.

The solenoid coil 31 is energized according to changes in D.C. voltage in the lines 65 and 66 from the bridge terminals 63 and 67 to the coil terminals 32 and 33. The greater the current flow, the smaller will be the flow past valve seat 18 and the greater the flow past valve seat 19.

Assuming the inlet 11 supplies cold water and the inlet 12 hot water, the auto-transformer 37, being adjusted to supply a required voltage to the rectifier 38, D.C. is created and flows, by lines 54 and 55, to the bridge 39. One path of D.C. flow from line 54 follows resistor 59, terminal 67, one of the lines 60, the thermistor 16, and the other of said line 60 to the input terminal 57 of the bridge 39. The other path passes through resistor 58, line 62, rheostats 40, and line 61 to input terminal 57 of the bridge. The resistances 58 and 59 are equal and the effective resistances of said rheostat and thermistor are also equal; the voltage across the terminals 63 and 67 being zero, there will be no potential in lines 65 and 66 and the solenoid coil 31 will not be energized. The poppet retains the position of FIG. 1 due to the bias of spring 30 and flow is obtained only from inlet 11 to outlet 13.

When the rheostat 40 is adjusted to reduce the resistance in the line 62, current flows in line 65, coil 31 and line 66, through rectifier 68 to terminal 63. Depending on the resistance level of rheostat 40, the energy exerted on the armature 34 will vary accordingly, and will shift the poppet against the fixed bias of spring 30. Depending on the increment of movement of the poppet, hot water from inlet 12 will flow past the valve seat 19 and a corresponding reduction in flow of cold water from inlet 11 past valve seat 18 will take place. The temperature of the outlet mixture of hot and cold water will be increased over that of the cold water alone.

The resistance of the thermistor 16 will respond to this temperature change, its resistance lowering accordingly. As said resistance continues to lower, the bridge 39 will move toward a balanced condition and the voltage drop across the terminals 63 and 67 will decrease. As the current decreases in the solenoid coil 31, the spring 30 becomes increasingly effective to move the poppet 14 to close seat 19 and open seat 18. This poppet movement maintains until the energy of the spring 30 and the energy residual in the armature 34 are balanced. The thermistor 16 will sense this lower temperature and its internal resistance will increase accordingly. This action imparts more energy to the solenoid to cause increase in the flow of hot water from inlet 12 and decrease of cold water from inlet 11. Depending on the ratio of the resistance between that of the rheostat 40 and the resistance of the thermistor 16, the temperature level of the water at outlet 13 will be determined.

A rectifier diode 68 in the line 66 limits the flow in said line in one direction when rheostat 40 is set to its maximum resistance to shut off the hot water.

To prevent heavy surge of water as either valve 18 or 19 is being opened, the poppet elements 23 and 24 have been shaped to produce slow opening flow, with increasingly larger continued flow. This prevents water hammer as well as wide range oscillations of temperature of outlet water. The flow rate may be changed by increments of change rather than by a programmed flow-rate contour.

The circuitry shown in FIG. 1 is for a two-station control. This is to provide the proper measure of safety in event rheostat 40 is located in a bathroom and the rheostat 41 is located, for instance, in a kitchen or other remote area. The rheostat 41 is disconnected when the rheostat 40 is in use, thereby insuring against change of the temperature of the outlet water except under control by the rheostat 40. The cam 64 provides such a safety feature by closing the normally-open switch 42 when the rheostat 40 is set to off position, at which time the circuit to the solenoid coil 31 will cease to control the same. When rheostats 40 and 41 are both set at maximum resistance, the effective resistance across the terminals 63 and 67 will be the same or greater than the effective resistance in the sensing circuit across the terminals 57 and 67. The direction of the current, then, will be outward and will be arrested by the rectifier 68, which will stop current flow to the solenoid coil 31, enabling spring 30 to close flow from inlet 12 and open flow from inlet 11. Thus, only cold water will flow to and out of the outlet 16.

When the switch 42 is closed, the rheostat 41 is activated. Since the rheostat 40 is at maximum resistance, the rheostat 41 can override it due to the parallel arrangement of the rheostats. Thus, the rheostat 41 can reduce the effective resitance across terminals 57 and 63, causing the coil 31 to energize the armature 34 and preset the temperature level of the discharge water at outlet 13, accordingly, by shifting the poppet 14. In operation of the poppet, the energy developed in the solenoid armature or plunger 34 is balanced against the bias of the spring 30. These balanced forces determine the degree of valve movement and the ratio of hot and cold liquids mixed in passage 22 and discharged through the outlet 13.

In the form of the invention that is illustrated in FIG. 2, the A.C. line 44 is directly connected across the terminals 56 and 57 of the Wheatstone bridge 39 which, as before, has the two other connections 63 and 67, the resistors 58 and 59 providing current-limiting resistance in each of the two bridge-circuit legs 57–67 and 56–63. The bridge leg 56–67 comprises the temperature level sensing leg in which resistors 69 and 70 are connected in series with terminal 71 common to both resistors, and terminals 72 and 73 at the respective ends of the resistors 69 and 70. In this case, the coil 31a of the A.C. solenoid 15a is connected by lines 65 and 66 across the terminals 63 and 67 of the bridge.

The bridge leg 56–63 comprises a resistance circuit 74 which constitutes the control leg of the bridge 39. The same comprises a circuit that includes a rheostat 75 that has a coil 76 that is connected across the bridge terminals 56 and 63 by conductors 77 and 78. A resistor 79 is interposed in series between conductor 77 and the rheostat coil or resistance 75, and a resistor 80 is interposed between the brush 81 and the conductor 78. A resistor 82 is connected in series with the resistor 80 and across the rheostat coil 76 and the brush 81. An impedance coil 83, by its terminals 84 and 85, is connected across the rheostat coil 76 and resistor 79, in series therewith. A variable impedance armature or core 86 is, in this case, connected to the stem extension 26. A conductor 87 extends between the terminal 84 and a connection 88 with the conductor 77 and the resistor 79; a conductor 89 extends between the terminal 85 and a connection 90 with the resistor 82; and a conductor 91 connects said connection 90 with the rheostat coil 76 on the end opposite the resistor 79. The sensor or thermistor 16 is connected by conductors 92 across the resistor 69 at terminals 71 and 72.

The operation of the valve 10 and the circuit 74 shown in FIG. 2 is as follows. The four legs of the bridge 39 are energized by the A.C. line 44. When the effective resistance of resistor 69 and the variable resistance of the thermistor 16, which are in parallel and which are in series with the resistor 70, balances the effective resistance in the circuit 74, little or no current flows in the solenoid circuit across the bridge terminals 63 and 67 to the solenoid coil 31a, which is not energized. Hence seat 19 of valve 10, by means of spring 30, remains closed to flow from inlet 12, and seat 18 is open to flow from inlet 11 to the outlet 13. Since a low temperature level in said outlet causes the resistance of the sensor 16 to be high, and a higher temperature level in said outlet causes the resistance of the sensor to be lower, the effective resistance of the resistors 69 and that of the sensor 16 will vary accordingly. This feature is the basic means of temperature control in the invention as in FIG. 1. The resistive T circuit that comprises the resistors 80, 82 and 79, rheostat 75, variable impedance coil 83 and its core 86, constitutes the control circuit 74 for presetting the desired temperature level of the dispensed hot water. The valve 10 functions as described with respect to FIG. 1. Spring 30 opposes the energy developed in solenoid armature 34 and is gradually compressed as the voltages applied to the coil 31 is increased. Therefore, the rate of current flow in said coil determines the degree of valve opening and the temperature level of the discharge water in pipe 13 establishes the proportionate rate of hot and cold water flow into the valve. When the poppet member 24 closes the seat 19, the rheostat brush 81 is adjusted to maximum resistance of the rheostat coil 76 in the series circuit with resistors 79 and 80.

The impedance coil 83 is across the resistors 79, 76 and 82, the impedance of said coil 83 being greatest when the solenoid coil 31a is unenergized and the valve 19–24 is closed. When the brush 81 is set at maximum resistance of the rheostat coil 76, which is adjacent to line 91, the effective resistance of the parallel combination of resistance 76, coil 83 and resistor 82 balances the effective resistance of the sensor 16 and the resistors 69 and 70, and no current flows through solenoid coil 31 since, under this condition, the bridge 39 is balanced and the potential across the terminals 63 and 67 is zero.

When the temperature of the water to be discharged is to be controlled at a required higher and specific temperature level, the brush 81 is moved to reduce the resistance of rheostat 75, thereby unbalancing the bridge 39 so current will flow to and energize the coil 31a. The resultant raising of the armature 34 and opening of valve seat 19 institute a mixed hot and cold water flow to the valve outlet. The plunger 86 will be partially pulled out of impedance coil 83 to decrease the impedance thereof so more current will flow and reduce the current flow through the rheostat 75.

The design of impedance coil 83 and its core is such that, for each increment of opening movement of poppet element 24, the increment of energy imparted to the solenoid coil 31a and plunger 34 will be less than build-up of opposing energy imparted by the spring 30 for each increment of movement of plunger 34, valve stem 14, and impedance core 86. Thus, the decreasing increments of impedance will not take over control from the rheostat 75, as set by the brush 81. A simple, inexpensive rheostat will serve in this organization. From the foregoing, it will be clear that a small current flow controls and modulates a much larger current flow.

The modification of FIG. 3 has basis on the rate-modulating means of FIG. 2. The Wheatstone bridge 39, the A.C. solenoid 15a, and the circuitry connecting said bridge and solenoid, are the same as in FIG. 2. The resistive circuit 74, however, and the impedance coil and its core, are replaced by a variable resistance control system 93. The bridge leg between terminals 56–67 is connected to the sensor 16 in the water outlet 13 in a manner similar to that shown in FIG. 2. The control system 93 is connected across the bridge terminals 56 and 63, as is the system 74 in FIG. 2.

Said control system 93 comprises a resistor 94, and a rheostat 95 connected in a parallel circuit 96, a conductor 97 from bridge power supply terminal 56 extending to a terminal 98 in said circuit 96. The rheostat 95 comprises a resistance 99 and a movable brush 100. A resistance 101 is connected in series with parallel resistors 94 and 99, and a brush 102, adjustably mounted on the stem extension 26, is operatively engaged with said resistance 101. A conductor 103 is connected between the power supply terminal 63 and said brush 102. It will be understood that the conductors 104 and 105 from the bridge terminals 67 and 56 connect to the resistors 69 and 70, as in FIG. 2, and that the sensor 16 is connected across the resistor 69, as in FIG. 2.

The Wheatstone bridge 39 of this form of the invention receives A.C. at terminals 56 and 57, the current being divided and flowing through resistors 58 and 59, as well as to the control system 93 across terminals 56 and 63. The A.C. solenoid 15a is energized or not according to the balanced or unbalanced condition of the bridge, as before. It will be clear that the stem extension 26 is moved in one direction by the spring 30 and in the opposite direction by the solenoid 15a, when energized, as hereinbefore described in connection with the form of FIG. 2.

The resistor 101 and brush 102 are used to provide a means for using a small-load, low-priced rheostat 95. As the resistance of the rheostat is reduced, the solenoid coil 31 is energized so as to exert a pull on the armature 34, thereby operating the poppet 14, as before, and also moving the brush 102 along the resistance 125, lowering the load on the rheostat resistance 99 and modifying the effective resistance in the sensing leg of the bridge. It will be understood that the brush control 26 cannot override or take the temperature level control function away from the rheostat brush 100, since the resistor 101 is connected in series with the parallel control system 93. Similarly, the resistor 69 and 70 in the sensor circuit prevent overload of the sensor 16. When the resistance of the sensor or thermistor 16 changes to a lower ohmage level, it reduces the effective resistance of resistor 69. This is sufficient to make minor corrections to compensate for temperature level changes of the incoming hot or cold water.

The valve illustrated in FIG. 4, insofar as its body 17 is concerned, is similar to the valve shown in FIG. 1. The inlet valve seat 19 that opens into inlet chamber 21 is also the same. The inlet valve seat 106 opens into the outlet chamber 22. In this form, the valve stem 107 has an axial passage 108 that opens at one end into the upper end of spring chamber 21, and at the lower end into the lower end of the chamber adjacent to cover 27. A shut-off valve disc 109 on the stem has operative association with the valve seat 19 to open and close the same, and a similar shut-off disc 110 is associated with and controls the valve seat 106. Between said discs, the stem carries a contoured or tapered valve component 111 to control the flow in a passage 112 which meters flow through said passage to the outlet 13, said component 111 being spaced from the passage 112 when the valve seat 19 is closed by the disc 109. A similar contoured valve component 113, below the disc 110, occupies and closes a passage 114 between the chambers 20 and 22 when the disc 110 closes the valve seat 106. Pistons 115 and 116 on the stem 107, one engaged in chamber 21 and the other in chamber 20, are formed with cups that seal against fluid passage therepast. A bleed passage 117 opens the inlet 11 to the lower end of the chamber 20 adjacent to cover 27. An upper extension 28 mounts an armature 34 of a solenoid 15 that has an energizing coil 31, as hereinbefore described. The lower stem extension 26 may, if desired, serve the same purposes as the similar extension of FIG. 2.

In the operation of the valve as in FIG. 4, the shut-off discs 109 and 110 close inlet flow under bias of the spring 30 until the coil 31 is sufficiently energized to pull on the armature 34 to raise the stem 107 against the bias of said spring 30. When water pressure is applied to the inlets 11 and 12, water from inlet 11 enters the lower end of the chamber 20 by way of the passage 117 and flows through the passage 108 in the stem into the upper end of the chamber 21, wherein the spring 30 is located. The passage 108, instead of being provided in the stem 107, may be incorporated in an outer connecting tube or a cored passage in the valve body 17 extending between said chambers 20 and 21. The pressures on the outer opposite ends of the pistons 115 and 116 are equal and opposite. Thus, the spring 30 exerts the only force that will bias the stem to valve-closing position, and any electrical failure of the means that open the valve results in automatic closing thereof.

When the valve disc 109 is raised to cause cold water to flow to discharge 13, which houses the thermistor 16, the valve disc 110 also raises to cause hot water flow to discharge. The contoured or tapered valve components 111 and 113 being oppositely arranged, the former moves to decrease the flow from the inlet 12 while the latter moves to increase the flow from the inlet 11, the sum of said flows being constant and the cold water flow diminishing as the hot water flow increases, until the desired proportion of hot and cold water flow is achieved. The shapes chosen for the valve components 111 and 113 will determine the modulation or proportioning of hot and cold water received in chamber 22 and discharged past the thermistor 16. Thus, the flow rate of the cold water may be decreased while the flow rate of the hot water is proportionally increased, or the reverse may be arranged.

As the valve stem 107 is being raised, the piston 115 displaces water from the upper part of chamber 21 through passage 108 into the lower part of the cavity 20, thereby dampening the movement of the stem 107 from one position to another. The same is true when the stem is being lowered. This dash pot action reduces hunting and inertia effects which might otherwise produce surges of hot or cold water as may be brought about by changes in rheostat control or surges in the power supply lines. The electric control systems of FIGS. 1, 2 or 3 may operate this valve, as above described.

The above valves modulate and proportion the flow rate and the mixing of two or more liquids to maintain, within operating tolerance, a uniform temperature of water discharged at outlet 13; or they may be used simply as valves for proportioning two or more liquids irrespective of temperature sensing and temperature controls.

The valve shown in FIG. 5 may be hydraulically operated by means of two D.C. solenoids 118 and 119 which are carried in side-by-side position by a cap 120 on the valve body 17, the same replacing the cap 29 used for the single solenoid 15 of the earlier valves. The solenoid 118 comprises a coil 121, an armature 122 operable in said coil, and an extension 123 from said armature provided with a valve 124 which controls water flow from the water inlet 12, through a passage 125 in the valve body 17, to a passage 126 in the cap 120 opening into the chamber 21 above the piston 115. In a similar manner, the solenoid 119 comprises a coil 127, an armature 128 operable in said coil, and an extension 129 from said armature provided with a valve 130 which controls water flow from the upper cavity 21 through a passage 131 into outlet 13. Due to the inversion of valve seat 106 with respect to the seat 18 in the earlier forms of the valve, the inlet 12 of FIG. 5 is a cold water connection and the inlet 11 a hot water connection.

It will be noted that the spring 30, heretofore used, has been omitted from the chamber 21, as has the stem extension 28. Due to the latter omission, the effective hydraulic pressure area on the upper side of the piston 115 is greater than such area on the bottom side of piston 116. This area differential results in an overbalancing hydraulic pressure on the piston 115, retaining the valve stem 107 in valve-closing position. It will be understood that the passage 108 is omitted from the valve stem in the modification of FIG. 5.

The diagram shown in FIG. 6 follows FIG. 1 in that the A.C. power line 44 is connected by conductors 45 and 48 across the terminals 46 and 49 of a full wave rectifier 38, and the latter, from its output terminals, by means of conductors 54 and 55, provides D.C. to the terminals 56 and 57 of the Wheatstone bridge 39. As before, two legs of the bridge are provided with fixed resistors 58 and 59. In this case, a third or control leg 57–63 includes a rheostat 41, and the fourth leg 57–67 is a sensor leg having a thermistor or sensor 16 in series with a resistor 94 having a variable resistance 101 in series and a brush 102 for said resistance, all connected across the thermistor 16. The brush 102 is adjustably carried by the stem extension 26 which, as above indicated, is provided on the stem 107 of FIG. 5. The solenoids 118 and 119 are connected in parallel with each other and by conductors 132 and 133 to the respective output terminals 63 and 67 of the Wheatstone bridge. The conductors are so connected to said solenoids that D.C. is supplied to them oppositely, the rectifiers 134 and 135 controlling the direction of current flow.

In the operation of the control circuit shown in FIG. 6, when the rheostat 41 is set for maximum resistance and the brush 102 is at the lower position of the valve stem 107, the resistance of said rheostat balances the effective sensing resistance of the resistor 94 and the parallel-connected sensor or thermistor 16 in series with resistor 101 and brush 102.

When the resistance in the bridge leg 57–63 balances the effective resistance in sensing leg 65–67, as above indicated, no current flows across the terminals 63 and 67. When an increase in the temperature level of the flow in the outlet 13 is required, the rheostat 41 is manually set to reduce its resistance and, therefore, of the control leg 57–63 of the bridge, thereby unbalancing the bridge so there will be current flow from bridge terminal 67, through conductor 133, to terminal 136 of solenoid 119, and from the other terminal 137, through rectifier 134 and conductor 132, to the bridge terminal 63. The rectifier 135 will block this flow to coil 121 of solenoid 119 and the latter will be unenergized.

The above energization of solenoid 119 will cause the armature 128 thereof to move in a direction to open valve 130, causing relief of pressure in the upper portion of chamber 21, through passage 131, to the outlet 13. The greater pressure in lower cavity 20 will urge pistons 116 and 115 upward. Therefore, the valve stem 107 will open flow from both inlets 11 and 12, past the valve elements 111 and 113, into the outlet 13. When the temperature of this mixed flow increases to the level of the preset temperature level set by the rheostat 4, the brush 102, being mounted on the extension 26 of stem 107, will be moved by the differential hydraulic forces on the pistons 115 and 116, as hereinbefore described. Said brush 102 will slide along resistor 164 and reduce the effective resistance across the bridge terminals 57–67 and valve 130 will close. Upon balance between bridge legs 57–63 and 57–67 being achieved, the valve stem 107 will become stationary. Upon any change of temperature of either or both the hot and cold water inlets, the resistance of the thermistor 16 will respond to again unbalance the bridge, so that a corrected setting of the stem 107 is effected and the bridge becomes rebalanced.

In cases where the temperature of water flowing out of the outlet 13 exceeds the upper limit of the operating temperature tolerance, the bridge will become unbalanced in the opposite direction. The effective resistance of the sensing leg 57–67 will be lower than the resistance in bridge leg 57–63, causing a current flow from bridge terminal 63, through conductor 132, to terminal 138 of solenoid 118, and from the other terminal 139, through rectifier 135 and conductor 133, to the bridge terminal 67. In this case, the rectifier 134 will block flow to the solenoid 119, which will remain unenergized. As a consequence, valve 124 will open and water from the inlet 12 will flow through passages 125 and 126 to the upper part of the chamber 21. This added pressure on the piston 115 will move the valve stem 107 downwardly to cause increase of cold water flow and corresponding decrease to hot water flow. When the sensor 16 senses this temperature reduction of the mixed flow reaching the outlet 13, it will increase its resistance and balance the bridge 39, causing the valve 124 to be closed, since there is no current flow to the solenoid 118.

It will be clear that alternatively opening and closing valves 124 and 130, as above outlined, will maintain a uniform temperature within operating tolerances. The reversal of current flow in conductors 132 and 133 accomplishes the above alternation.

While the foregoing has illustrated and described what is now contemplated to be the best mode of carrying out the invention, the constructions are, of course, subject to modification without departing from the spirit and scope of the invention. Therefore, it is not desired to restrict the invention to the particular forms of construction illustrated and described, but to cover all modifications that may fall within the scope of the appended claims.

Having thus described the invention, what is claimed and desired to be secured by Letters Patent is:

1. Temperature control means for fluid flow comprising:
   (a) a valve having a body with two inlets, each for water at different temperatures, and an outlet with a temperature sensor in the path of water flow through the outlet and having an electrical resistance that varies in response to changes of the level of temperature of the water passing through said outlet,
   (b) a valve seat in the valve between said inlet and the outlet,
   (c) a poppet provided with two spaced seat-closing elements, said seats and elements being relatively spaced so that, upon movement of the poppet, one said element moves in seat-closing direction while the other moves in seat-opening direction, thereby proportioning the flow from the inlets to the outlet according to the positions of the poppet elements,
   (d) solenoid means which, when electrically energized, moves said poppet,
   (e) A Wheatstone bridge connected to a source of electric current and provided, in two of its legs, with fixed reference resistors, a sensor leg of said bridge being in circuit with said sensor, and a control leg thereof being provided with control rheostat means, the output terminals of the bridge being connected to the solenoid means, and
   (f) an electric system, including the Wheatstone bridge, that energizes the solenoid means in response to resistance changes in the sensor to adjust the position of the poppet and its elements relative to the valve seats to proportion the flow reaching the valve outlet from the two valve inlets.

2. Temperature control means according to claim 1 in which a biasing spring is engaged with the poppet to resiliently oppose the movement of the poppet by the solenoid means.

3. Temperature control means according to claim 2 in which:
   (a) the solenoid means comprises a D.C. solenoid having an armature that is connected to the valve poppet,
   (b) the current source comprises A.C., and
   (c) means is connected to the input of the Wheatstone bridge to convert the A.C. to D.C.

4. Temperature control means according to claim 3 in which the latter means comprises an auto-transformer and a full wave rectifier connected in parallel, the output terminals of said rectifier being connected across the input terminals of the Wheatstone bridge.

5. Temperature control means according to claim 1 in which the control rheostat means comprises:
   (a) two rheostats connected in parallel,
   (b) a normally-open switch in the circuit of one rheostat, and
   (c) a controller on the other rheostat to close said switch when set to maximum resistance and to activate said one rheostat.

6. Temperature control means according to claim 1 in which:
   (a) a resistor is connected in the control leg of the Wheatstone bridge and is provided with a resistance-varying member connected to and movable with the valve poppet, and
   (b) the control leg of the bridge is connected across the circuit to an impedance coil.

7. Temperature control means according to claim 6 in which said control leg comprises a complement of resistors arranged in T circuit, one of which is presettable.

8. Temperature control means according to claim 7 in which the sensor leg of the Wheatstone bridge is provided with two resistors with one resistor across the sensor and the other in series with said sensor.

9. Temperature control means according to claim 1 in which:
   (a) a variable resistance control system is connected in the control leg of the Wheatstone bridge,
   (b) said system comprising a rheostat resistor and a resistor in parallel circuit with one terminal of said leg, said rheostat having a resistance-varying brush connected to said leg,
   (c) a resistance connected in series with said parallel resistors,
   (d) a brush engaged with said latter resistance and adjustably connected to the valve stem, and
   (e) a conductor extending from the latter brush to a power terminal of said control leg.

10. Temperature control means according to claim 9 in which the sensor leg of said bridge is provided with two resistors, with one resistor across the sensor and the other in series with the sensor.

11. Temperature control means according to claim 2 in which:
 (a) the two valve seats face in the same direction, and
 (b) each of the poppet elements is provided with a seat-closing disc, said discs being located on the elements to close both seats when the elements are positioned with one element in flow-open position and the other in flow-closed position.

12. Temperature control means according to claim 11 in which:
 (a) the valve inlets open into cylindrical chambers,
 (b) the ends of the poppet are provided with flow-sealing pistons that have sliding engagement in said cylinders, and
 (c) the poppet having a stem that mounts the poppet elements, discs and pistons,
 (d) a longitudinal passage opening into said cylinders beyond the outer ends of the pistons and connecting said cylinders,
 (e) said pistons and passage combining to eliminate water hammer in the valve during movement of the poppet.

13. Temperature control means according to claim 12 in which is provided a passage from one inlet to the outer end of the cylinder into which said inlet opens, water from said inlet entering said cylinder and, through said stem passage, flowing to the outer end of the opposite cylinder, said water being displaced from one cylinder to the other during poppet movement by the solenoid armature and the biasing spring.

14. Temperature control means according to claim 1 in which:
 (a) the solenoid means comprises two solenoids mounted on the valve body,
 (b) the valve inlets open into cylindrical chambers at opposite ends of the valve,
 (c) the ends of the poppet are provided with flow-sealing pistons that have sliding engagement in said cylinders, the poppet member, terminating at the outer face of the piston thereon, and the opposite end having a stem that extends through the opposite end of the valve,
 (e) a passage connecting one inlet and the upper end of one of the cylindrical chambers is directed toward the solenoids,
 (f) a passage similarly connects the outlet and said end of the latter cylindrical chamber,
 (g) each passage is provided with a valve, the valve in the first passage being set to open under hydraulic pressure in the latter chamber, and the valve in the second passage being set to be retained closed by hydraulic pressure in said chamber, each valve being operatively connected to the armature of one of said solenoids,
 (h) said electric system in which the Wheatstone bridge is included has said two solenoids connected in parallel across the output terminals of the bridge with oppositely connected current-controlling rectifiers in the circuit of each solenoid, and
 (i) means operative upon a change in the electrical balance of the bridge to energize one solenoid or the other, accordingly, to thereby open the valve with which operatively connected, thereby effecting the hydraulic pressure in said cylindrical chamber and causing the poppet to move.

15. Temperature control means according to claim 14 in which:
 (a) the extending poppet stem is provided with an adjustable brush that is connected in the sensor leg of the Wheatstone bridge, and
 (b) the last-mentioned means comprises a resistor connected in parallel with the sensor, and a resistance engaged by said brush and connected as a series extension of said resistor.

16. Temperature control means for fluid flow comprising:
 (a) a valve having a body with two inlets, each for water at different temperatures, and an outlet with a temperature sensor in the path of water flow through the outlet and having an electrical resistance that varies in response to changes of the level of temperature of the water passing through said outlet,
 (b) a valve seat in the valve between each inlet and the outlet,
 (c) a poppet provided with two spaced seat-closing elements, said seats and poppet being relatively spaced so that, upon movement of the poppet, one said element moves in seat-closing direction while the other moves in seat-opening direction, thereby proportioning the flow from the inlets to the outlet according to the positions of the poppet,
 (d) solenoid means having an energizing coil and an armature to move the poppet in one direction,
 (e) a system that generates modulated voltage to energize said coil to move said armature, and
 (f) a connection between said armature and the poppet to cause the latter to move with the armature,
 (g) said system comprising flow-rate-proportioning means having sensor-controlled rate-modulating means.

17. Temperature control means according to claim 2 in which the solenoid means comprises an A.C. solenoid having an armature that is connected to the valve poppet.

References Cited
UNITED STATES PATENTS

| | | | |
|---|---|---|---|
| 1,476,718 | 12/1923 | Leonard | 236—12 |
| 1,819,045 | 8/1931 | Snediker | 236—12 |
| 2,275,317 | 3/1942 | Ryder | 236—74 |
| 2,451,459 | 10/1948 | Williams. | |
| 2,635,225 | 4/1953 | Hadady. | |
| 2,842,345 | 7/1958 | Brown. | |
| 2,975,976 | 3/1961 | Smith et al. | 236—84 X |
| 3,003,700 | 10/1961 | Joesting | 236—36 |

OTHER REFERENCES

Instrumentation, vol. 2, No. 4, 1947, pages 13–17 (only pages 16 and 17 relied on).

ROBERT A. O'LEARY, *Primary Examiner.*

ALDEN D. STEWART, *Examiner.*

W. E. WAYNER, *Assistant Examiner.*